US011266264B2

(12) United States Patent
Anthony et al.

(10) Patent No.: US 11,266,264 B2
(45) Date of Patent: Mar. 8, 2022

(54) AUTOMATIC COFFEE MAKER PROCESS FOR PREPARING A COLD BREWED BEVERAGE

(71) Applicant: SHARKNINJA OPERATING LLC, Needham, MA (US)

(72) Inventors: Joshua D. Anthony, North Billerica, MA (US); Ethan T. Brown, Cambridge, MA (US); Suzette Hammond, Chicago, IL (US); Chad P. Woodrow, Somerville, MA (US)

(73) Assignee: Sharkninja Operating LLC, Needham, MA (US)

( * ) Notice: Subject to any disclaimer, the term of this patent is extended or adjusted under 35 U.S.C. 154(b) by 41 days.

(21) Appl. No.: 16/444,827

(22) Filed: Jun. 18, 2019

(65) Prior Publication Data
US 2019/0387920 A1  Dec. 26, 2019

Related U.S. Application Data

(60) Provisional application No. 62/688,056, filed on Jun. 21, 2018.

(51) Int. Cl.
*A47J 31/52* (2006.01)
*A47J 31/00* (2006.01)

(52) U.S. Cl.
CPC ......... *A47J 31/5253* (2018.08); *A47J 31/002* (2013.01)

(58) Field of Classification Search
CPC ............................ A47J 31/5253; A47J 31/002
See application file for complete search history.

(56) References Cited

U.S. PATENT DOCUMENTS

| D213,577 | S | 3/1969 | Douglas |
| D225,365 | S | 12/1972 | Beckman |
| D245,058 | S | 7/1977 | Hauenstein |
| 4,058,338 | A | 11/1977 | Brown |
| D253,572 | S | 12/1979 | Rinaldi |
| 4,503,757 | A | 3/1985 | Daugherty |
| 4,590,975 | A | 5/1986 | Credle |

(Continued)

FOREIGN PATENT DOCUMENTS

| JP | 817686 | 9/1991 |
| JP | 1578234 | 5/2017 |

(Continued)

OTHER PUBLICATIONS

Spruce Eats: Tea Brewing Times and Temperatures. 2017. https://www.thespruceeats.com/tea-brewing-times-and-temperatures-1328730.*

(Continued)

*Primary Examiner* — Anthony J Weier
(74) *Attorney, Agent, or Firm* — Mintz Levin Cohn Ferris Glovsky and Popeo, PC; Lisa Adams

(57) ABSTRACT

A method of preparing a brewed beverage using a beverage brewing apparatus includes providing a flavorant, identifying a process cycle including one or more infusion cycles for preparing the brewed beverage, performing said one or more infusion cycles, wherein said performing of said one or more infusion cycles includes providing fluid to said flavorant, and varying a temperature of said fluid provided to said flavorant during a single infusion cycle of said one or more infusion cycles, or between a plurality of infusion cycles of said one or more infusion cycles.

18 Claims, 10 Drawing Sheets

(56) References Cited

U.S. PATENT DOCUMENTS

| | | | |
|---|---|---|---|
| D296,408 S | 6/1988 | Gaunt et al. | |
| D314,881 S | 2/1991 | Wondergem et al. | |
| D317,996 S | 7/1991 | Jack | |
| D318,973 S | 8/1991 | Hasslacher | |
| D321,806 S | 11/1991 | Chaney | |
| D324,319 S | 3/1992 | Faerber et al. | |
| D327,601 S | 7/1992 | Beeren et al. | |
| D337,915 S | 8/1993 | Kahlcke | |
| D348,585 S | 7/1994 | Sham | |
| D379,049 S | 5/1997 | Amiel | |
| D381,237 S | 7/1997 | Delonghi | |
| D381,437 S | 7/1997 | Browning | |
| D409,875 S | 5/1999 | Alonge et al. | |
| 5,931,082 A | 8/1999 | Kim et al. | |
| 6,148,717 A * | 11/2000 | Lassota | A47J 31/06 99/283 |
| D452,106 S | 12/2001 | Seiffert | |
| D490,639 S | 6/2004 | Kling | |
| D558,507 S | 1/2008 | Picozza et al. | |
| D562,052 S | 2/2008 | De Pra' | |
| D577,244 S | 9/2008 | Cahen | |
| D581,717 S | 12/2008 | Parker et al. | |
| D584,912 S | 1/2009 | Green et al. | |
| D585,691 S | 2/2009 | Borin | |
| D594,688 S | 6/2009 | Hammad et al. | |
| D598,693 S | 8/2009 | Kindler et al. | |
| D598,695 S | 8/2009 | Currie | |
| 7,717,026 B1 * | 5/2010 | Lassota | A47J 31/56 99/283 |
| D634,962 S | 3/2011 | Butler | |
| D634,963 S | 3/2011 | Romandy | |
| D648,973 S | 11/2011 | De' Longhi | |
| 8,210,095 B2 | 7/2012 | Brezovnik et al. | |
| D696,890 S | 1/2014 | Poniedzialek | |
| D713,668 S | 9/2014 | Metaxatos et al. | |
| D727,084 S | 4/2015 | Dorr et al. | |
| D730,675 S | 6/2015 | Williams et al. | |
| D733,481 S | 7/2015 | Rousselin | |
| D742,159 S | 11/2015 | Doria et al. | |
| D752,377 S | 3/2016 | Maitland et al. | |
| D753,948 S | 4/2016 | Kestenbaum | |
| D756,696 S | 5/2016 | Murphy et al. | |
| D765,454 S | 9/2016 | Romandy | |
| D769,662 S | 10/2016 | Palermo et al. | |
| D770,831 S | 11/2016 | Affatato et al. | |
| D770,832 S | 11/2016 | Affatato et al. | |
| D771,992 S | 11/2016 | Yang | |
| D778,098 S | 2/2017 | Horimoto | |
| D782,242 S | 3/2017 | Lee | |
| D787,251 S | 5/2017 | Kestenbaum | |
| D789,725 S | 6/2017 | Kestenbaum | |
| D792,731 S | 7/2017 | Palermo et al. | |
| D801,506 S | 10/2017 | Sevy | |
| D802,978 S | 11/2017 | Kestenbaum | |
| D803,611 S | 11/2017 | Hanneson et al. | |
| D814,222 S | 4/2018 | Bronwasser | |
| D815,904 S | 4/2018 | Lane | |
| D823,035 S | 7/2018 | Ricica | |
| D823,036 S | 7/2018 | Kestenbaum | |
| D823,628 S | 7/2018 | Steiner | |
| D833,792 S | 11/2018 | Garman | |
| D834,870 S | 12/2018 | Steiner | |
| D853,770 S | 7/2019 | Koury et al. | |
| D854,363 S | 7/2019 | Behrmann | |
| D878,846 S | 3/2020 | Kestenbaum | |
| D879,535 S | 3/2020 | Ricica | |
| 2004/0112224 A1 | 6/2004 | Drobeck | |
| 2005/0166765 A1 * | 8/2005 | Lyall, III | A47J 31/0576 99/280 |
| 2009/0255408 A1 * | 10/2009 | Lassota | A47J 31/5253 99/282 |
| 2010/0107885 A1 * | 5/2010 | Kirschner | A23F 3/18 99/279 |
| 2015/0190011 A1 | 7/2015 | Minard | |
| 2016/0360919 A1 * | 12/2016 | Burrows | A47J 31/3628 |
| 2017/0156539 A1 * | 6/2017 | Han | A47J 31/002 |
| 2017/0367518 A1 * | 12/2017 | Anthony | A47J 31/0652 |
| 2018/0098658 A1 * | 4/2018 | Angell | A47J 31/469 |
| 2019/0045968 A1 | 2/2019 | Hartmann et al. | |

FOREIGN PATENT DOCUMENTS

| | | |
|---|---|---|
| JP | 1578238 | 5/2017 |
| WO | 2013098777 A1 | 7/2013 |
| WO | 2014028844 A1 | 2/2014 |
| WO | 2016164796 A1 | 10/2016 |
| WO | 2019067595 A1 | 4/2019 |

OTHER PUBLICATIONS

Application for Registration of an Industrial Design Examiner's Report; Canadian Application No. 171623; dated Nov. 14, 2017; 2 Pages.

Application for Registration of an Industrial Design Examiner's Report; Canadian Application No. 171623; dated Feb. 17, 2017; 1 Page.

Application for Registration of an Industrial Design Examiner's Report; Canadian Application No. 171623; dated Jul. 25, 2017; 1 Page.

Decision to Dismiss the Amendment; Korean Application No. 30-2016-0053885; dated Jul. 6, 2017; 5 Pages.

Non-Final Office Action; U.S. Appl. No. 29/564,778, filed May 16, 2016; Carafe; Notification dated Mar. 10, 2017; 9 Pages.

Non-Final Office Action; U.S. Appl. No. 29/622,046, filed Oct. 13, 2017; Carafe; Notification dated Jun. 5, 2018; 20 Pages.

Notice of Allowance; Japanese Design Application No. 2016-024849; dated Mar. 31, 2017; 2 Pages.

Notice of Allowance; Japanese Design Application No. 2016-024850; dated Mar. 31, 2017; 2 Pages.

Notice of Allowance; Japanese Design Application No. 2016-024851; dated Mar. 31, 2017; 2 Pages.

Notice of Allowance; Japanese Design Application No. 2016-024852; dated Mar. 31, 2017; 2 Pages.

Notice of Allowance; Japanese Design Application No. 2016-024853; dated Mar. 31, 2017; 2 Pages.

Notice of Allowance; Japanese Design Application No. 2016-024854; dated Mar. 31, 2017; 2 Pages.

Notice of Allowance; Japanese Design Application No. 2016-024855; dated Mar. 31, 2017; 2 Pages.

Notice of Allowance; U.S. Appl. No. 29/564,776, filed May 16, 2016; Coffee Maker; Notification dated Mar. 21, 2018; 11 Pages.

Notice of Allowance; U.S. Appl. No. 29/564,778, filed May 16, 2016; Carafe; Notification dated Jul. 13, 2017; 10 Pages.

Notice of Allowance; U.S. Appl. No. 29/564,780, filed May 16, 2016; Coffee Maker; Notification dated Mar. 21, 2018; 11 Pages.

Notice of Completion of Formalities for Patent Register and Notice of Grant of Design Patent Right; Chinese Application No. 2016305567649; dated Jan. 19, 2017; 5 Pages.

Notice of Completion of Formalities for Patent Register and Notice of Grant of Design Patent Right; Chinese Application No. 2016305570459; dated Jan. 19, 2017; 5 Pages.

Notice of Completion of Formalities for Patent Register and Notice of Grant of Design Patent Right; Chinese Application No. 201630557068X; dated Jan. 19, 2017; 5 Pages.

Notice of Completion of Formalities for Patent Register and Notice of Grant of Design Patent Right; Chinese Application No. 2016305573207; dated Jan. 17, 2017; 5 Pages.

Notice of References; Japanese Design Application No. 2016-024849; dated Mar. 31, 2017; 2 Pages.

Notice of References; Japanese Design Application No. 2016-024850; dated Mar. 31, 2017; 2 Pages.

Preliminary Rejection; Korean Application No. 30-2016-0053875; dated Jul. 4, 2017; 3 Pages.

Preliminary Rejection; Korean Application No. 30-2016-0053876; dated Oct. 14, 2017; 7 Pages.

Preliminary Rejection; Korean Application No. 30-2016-0053877; dated Jul. 4, 2017; 4 Pages.

(56) References Cited

OTHER PUBLICATIONS

Preliminary Rejection; Korean Application No. 30-2016-0053878; dated Jul. 4, 2017; 2 Pages.
Preliminary Rejection; Korean Application No. 30-2016-0053879; dated Jul. 4, 2017; 5 Pages.
Preliminary Rejection; Korean Application No. 30-2016-0053882; dated Jul. 4, 2017; 5 Pages.
Preliminary Rejection; Korean Application No. 30-2016-0053885; dated Jul. 4, 2017; 5 Pages.
Requirement for Restriction/Election; U.S. Appl. No. 29/564,776, filed May 16, 2016; Coffee Maker and Components Thereof; Notification dated Dec. 7, 2017; 18 Pages.
Requirement for Restriction/Election; U.S. Appl. No. 29/564,780, filed May 16, 2016; Coffee Maker and Components Thereof; Notification dated Dec. 7, 2017; 18 Pages.
U.S. Appl. No. 29/622,046, filed Oct. 13, 2017; Notice of Allowance dated Oct. 25, 2018; 6 pages.
U.S. Appl. No. 29/653,369, filed Jun. 14, 2018; Restriction Requirement dated Jul. 18, 2019; 19 pages.
U.S. Appl. No. 29/653,379, filed Jun. 14, 2018; Restriction Requirement dated Jul. 18, 2019; 19 pages.
U.S. Appl. No. 29/724,419, filed Feb. 14, 2020; Restriction Requirement mailed Apr. 27, 2020; 9 pages.
Amazon.com, Inc., "SharkNinja CF092 PowerDoF CM6626T 12-Cup Glass Carafe Programmable Coffee Maker, Small, Black/Stainless Steel," retrieved from Internet Jan. 24, 2020, (JPO Publicly Known Design No. HJ28047009), 8 pages.
Hammacher Schlemmer, "The Four Specific Brew Barista Machine," 89861, retrieved from Internet Jan. 24, 2020, (JPO Publicly Known Design No. HJ28041235), 3 pages.
International Search Report for International Application No. PCT/US2019/038269; dated Nov. 25, 2019; International Filing Date: Jun. 20, 2019; 7 pages.
Invitation to Pay Additional Fees for International Application No. PCT/US2019/038269; International Filing Date Mar. 20, 2019; dated Sep. 27, 2019; 197 pages.
Japanese Design Application No. 201826036 filed Nov. 30, 2018; Notice of Allowance dated Nov. 8, 2019; 6 pages.
Japanese Design Application No. 201826037 filed Nov. 30, 2018; Notice of Allowance dated Nov. 8, 2019; 6 pages.
Korean Design and Trademark Gazette, vol. 795, (Aug. 23, 1989), p. 40, 93797, (JPO Publicly Known Design No. HH02008182), 4 pages.
Philips, "1/91Elektro-Hausgera"Te-Programm," HD5860, p. 23, dated Nov. 28, 1991, (JPO Publicly Knwon Design No. HD04000894), 5 pages, no translation. . . considered in what may be gleaned from figures.
U.S. Appl. No. 29/649,476, filed May 30, 2018; Restriction Requirement dated Jan. 16, 2020; 8 pages.
U.S. Appl. No. 29/649,476, filed May 30, 2018; Restriction Requirement dated Dec. 19, 2019; 7 pages.
U.S. Appl. No. 29/649,477, filed May 30, 2018; Restriction Requirement dated Dec. 19, 2019; 7 pages.
Written Opinion for International Application No. PCT/US2019/038269; dated Nov. 25, 2019; International Filing Date: Jun. 20, 2019; 7 pages.
Amazon.com; "SharkNinja PowerDoF CM6626T 12-Cup Glass Carafe Programmable Coffee Maker, Small, Black/Stainless Steel"; Nov. 11, 2016; pp. 1-11; https://www.amazon.com/gp/product/b01ka7vwpy/ref=zg_bsnr_289745_1?ie=utf8&psc= 1 &refrid= nry9kbp5b5nrh7e6dp8n.
Japanese Patent Application No. 2019018140 filed Aug. 16, 2019; Office Action dated May 11, 2020; 6 pages.
U.S. Appl. No. 29/680,943, filed Feb. 21, 2019; Restriction Requirement dated May 1, 2020; 16 pages.

* cited by examiner

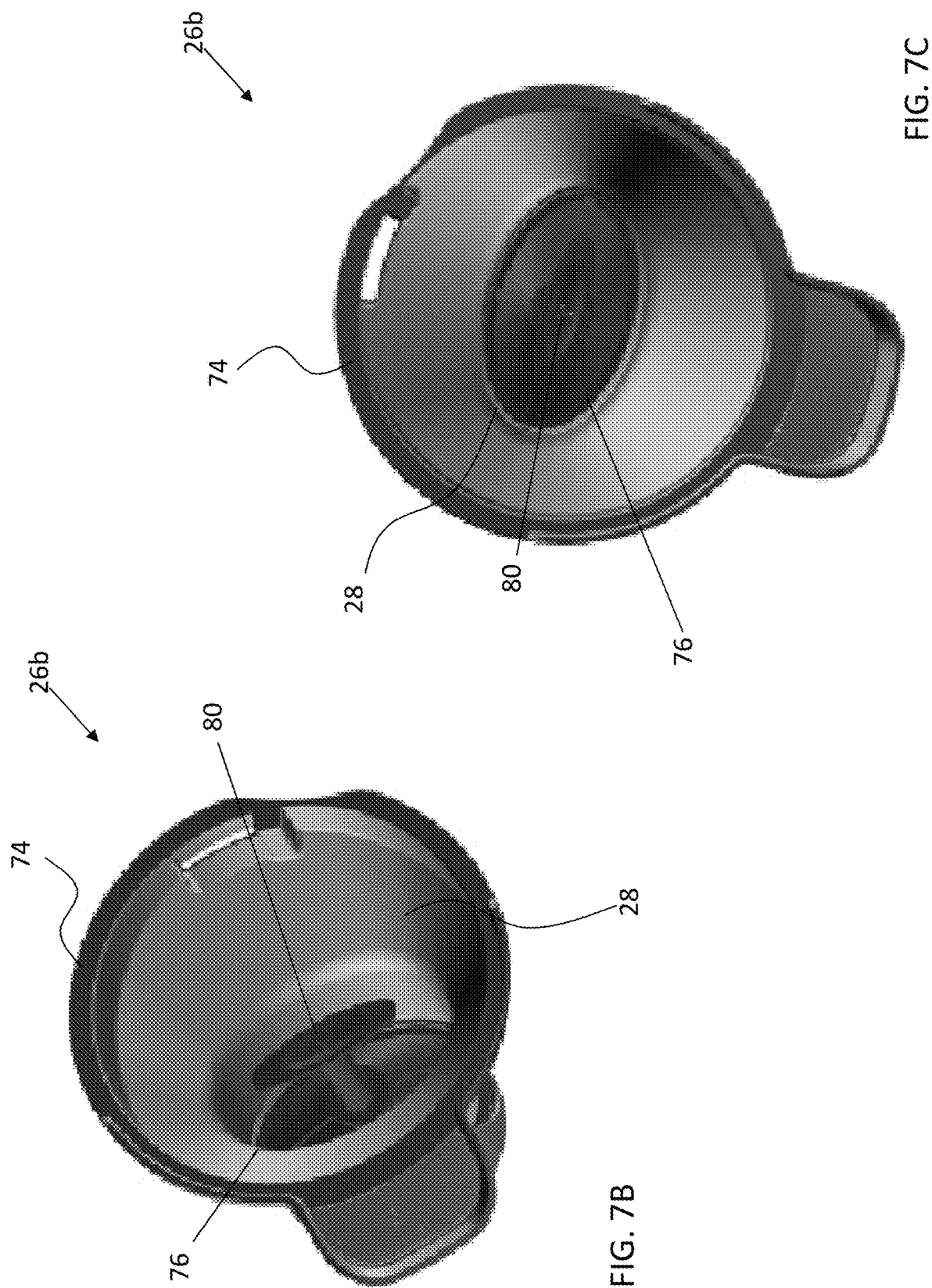

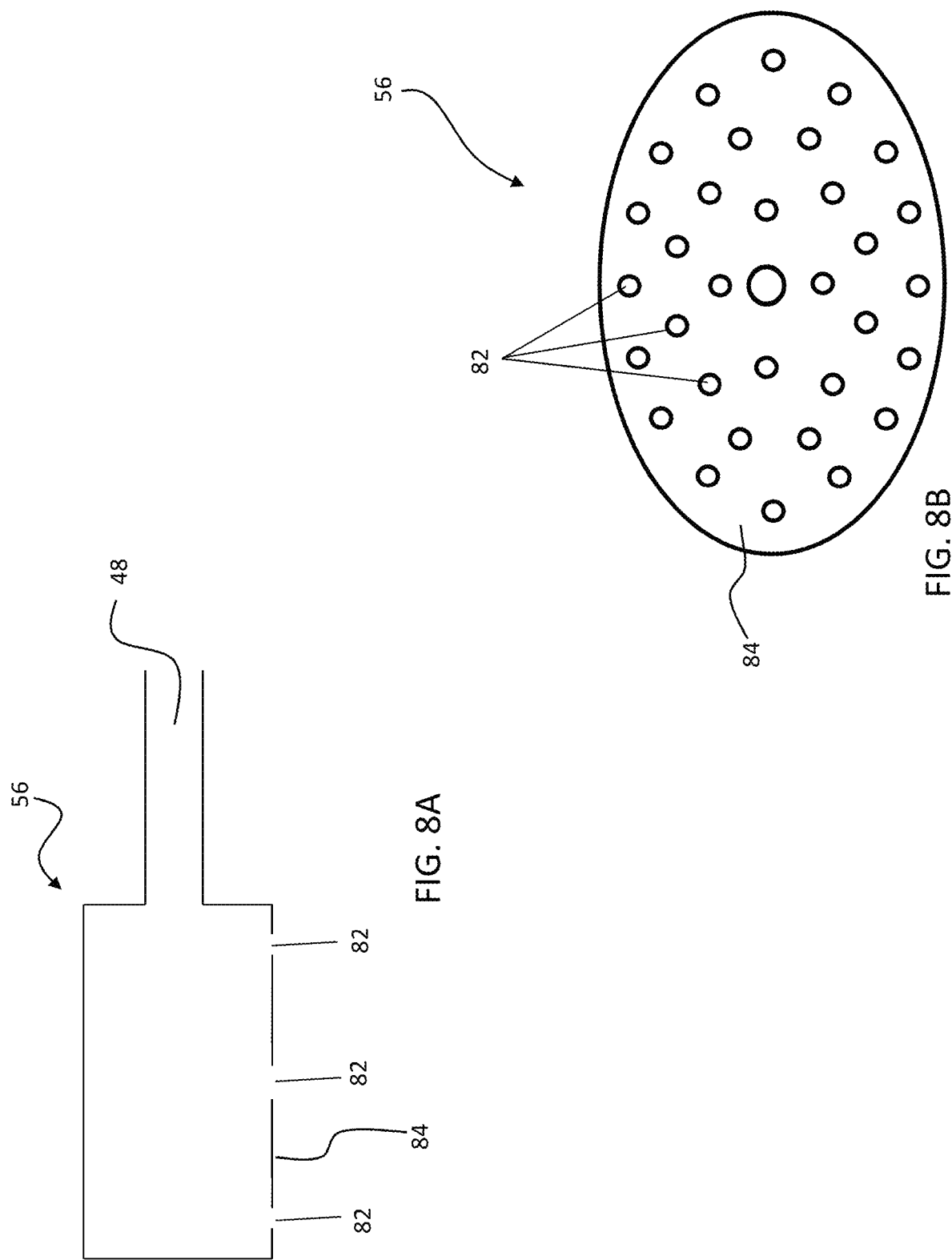

AUTOMATIC COFFEE MAKER PROCESS FOR PREPARING A COLD BREWED BEVERAGE

CROSS-REFERENCE TO RELATED APPLICATIONS

This application claims the benefit of U.S. Provisional Application Ser. No. 62/688,056 filed Jun. 21, 2018, which is incorporated herein by reference in its entirety.

BACKGROUND

Exemplary embodiments of the present disclosure relate to a system and method for brewing beverages, and more particularly to a system and method for preparing a various types of brew beverages using different flavorants.

Various systems and methods for brewing a beverage, such as coffee or tea, are known. Known systems include drip brewing systems in which hot water is brewed through coffee grounds and into a carafe and French press systems in which coffee grounds and water are mixed in a container and a water permeable plunger is pressed into the container from above to trap the ground coffee at the bottom of the container. In addition, various systems and methods specific to preparation of a chilled or cold brewed beverage are also known. One form of cold brewing technique uses a volume of a coffee grinds retained in a filter device in combination with ambient or chilled liquid dispensed into the coffee grinds. This technique steeps or soaks ground coffee over a long period of time in a large volume container such as a bucket and requires draining and filtering after the steeping period. Another cold brewing technique uses a controlled slow dispensing or drip dispensing of ambient or chilled water onto coffee grinds over an extended period of time to limit the contact time the water has with the coffee grinds as it passes through the coffee grinds and the filter for subsequent dispensing into a collection container. These cold brewing processes can take hours to achieve a desired flavor.

Accordingly, a beverage brewing system capable of brewing both hot and cold beverages of a variety of flavor profiles using various types of flavorants in a time efficient manner is desirable.

SUMMARY

According to one embodiment, a method of preparing a brewed beverage using a beverage brewing apparatus includes providing a flavorant, identifying a process cycle including one or more infusion cycles for preparing the brewed beverage, performing said one or more infusion cycles, wherein said performing of said one or more infusion cycles includes providing fluid to said flavorant, and varying a temperature of said fluid provided to said flavorant during a single infusion cycle of said one or more infusion cycles, or between a plurality of infusion cycles of said one or more infusion cycles.

In addition to one or more of the features described above, or as an alternative, in further embodiments said temperature is varied from a first temperature to a second temperature, and said first temperature is greater than said second temperature.

In addition to one or more of the features described above, or as an alternative, in further embodiments said temperature is varied from a first temperature to a second temperature, and said second temperature is greater than said first temperature.

In addition to one or more of the features described above, or as an alternative, in further embodiments said temperature of said predetermined volume of fluid is dependent of said flavorant.

In addition to one or more of the features described above, or as an alternative, in further embodiments comprising selecting at least one of a volume of beverage to be prepared and a style of beverage to be prepared, said one or more infusion cycles being identified in response to selecting at least one of said volume of beverage to be prepared and said style of beverage to be prepared.

In addition to one or more of the features described above, or as an alternative, in further embodiments selecting a category of flavorant.

In addition to one or more of the features described above, or as an alternative, in further embodiments said category of flavorant is selected from at least a coffee and a tea.

In addition to one or more of the features described above, or as an alternative, in further embodiments selecting said category of flavorant includes affixing a brew basket to a housing of the beverage brewing apparatus.

In addition to one or more of the features described above, or as an alternative, in further embodiments comprising selecting a type of flavorant from within said category of flavorant.

In addition to one or more of the features described above, or as an alternative, in further embodiments said one or more infusion cycles further comprise heating said fluid within a heating mechanism prior to providing said fluid to said flavorant.

In addition to one or more of the features described above, or as an alternative, in further embodiments a temperature of said heating mechanism is substantially equal to a temperature of said fluid provided to said flavorant.

According to another embodiment, a method of preparing a brewed beverage using a beverage brewing apparatus includes providing a flavorant within a brew basket, selecting a brew process including at least a first infusion cycle and a second infusion cycle, performing said first infusion cycle, said first infusion cycle including providing a first volume of fluid to said flavorant, and performing said second infusion cycle, said second infusion cycle including providing a second volume of fluid to said flavorant such that at least a portion of said first volume of fluid and at least a portion of said second volume of fluid mix within said brew basket.

In addition to one or more of the features described above, or as an alternative, in further embodiments performing said second infusion cycle further comprises draining said first volume of fluid from said flavorant.

In addition to one or more of the features described above, or as an alternative, in further embodiments performing said second infusion cycle further comprises providing said second volume of fluid to said flavorant as said first volume of fluid drains from said flavorant.

In addition to one or more of the features described above, or as an alternative, in further embodiments said at least one of said first infusion cycle further comprises steeping said flavorant within said first volume of fluid for a predefined length of time.

In addition to one or more of the features described above, or as an alternative, in further embodiments steeping said flavorant within said volume of fluid for said predefined length of time further comprises retaining a steeping valve in a closed position during said predefined length of time.

In addition to one or more of the features described above, or as an alternative, in further embodiments said first volume of fluid has a first temperature and said second volume of fluid has a second temperature, different from said first temperature.

In addition to one or more of the features described above, or as an alternative, in further embodiments comprising selecting at least one of a volume of beverage to be prepared and a style of beverage to be prepared.

In addition to one or more of the features described above, or as an alternative, in further embodiments said brew cycle is selected in response to selecting at least one of said volume to be prepared and said type of flavorant provided.

In addition to one or more of the features described above, or as an alternative, in further embodiments comprising selecting a category of flavorant.

In addition to one or more of the features described above, or as an alternative, in further embodiments selecting said category of flavorant includes affixing a brew basket to a housing of the beverage brewing apparatus.

In addition to one or more of the features described above, or as an alternative, in further embodiments comprising selecting a type of flavorant from within said category of flavorant.

According to another embodiment, a method of preparing a brewed beverage includes selecting a brew cycle including at least one infusion cycle and performing said at least one infusion cycle, said at least one infusion cycle. Performing said at least one infusion cycle includes providing a volume of fluid to a flavorant, cooling said volume of fluid, and purging said cooled volume of fluid from said flavorant.

In addition to one or more of the features described above, or as an alternative, in further embodiments comprising providing said cooled volume of fluid to a container at least partially filled with ice.

In addition to one or more of the features described above, or as an alternative, in further embodiments performing said brew cycle includes steeping said flavorant within said volume of fluid, said volume of fluid having a temperature between about 30° C. and about 50° C.

In addition to one or more of the features described above, or as an alternative, in further embodiments purging said cooled volume of fluid from said flavorant includes draining said volume of fluid via gravity.

In addition to one or more of the features described above, or as an alternative, in further embodiments said flavorant and said volume of fluid are contained within a brew basket and purging said cooled volume of fluid further comprises operating a pressure source to increase a pressure within said brew basket.

In addition to one or more of the features described above, or as an alternative, in further embodiments said brew basket is sealed against an adjacent component when said pressure source is operated.

In addition to one or more of the features described above, or as an alternative, in further embodiments said flavorant and said volume of fluid are contained within a brew basket and wherein said purging said cooled volume of fluid from said flavorant further comprises opening a steeping valve to expose an opening in said brew basket.

According to yet another embodiment, a method of preparing a brewed beverage using a beverage brewing apparatus in communication with a user interface includes coupling a brew basket to a housing of the beverage brewing apparatus and displaying a category of one or more input options on the user interface in response to said coupling of said brew basket.

In addition to one or more of the features described above, or as an alternative, in further embodiments including coupling a second brew basket to said housing of the beverage brewing apparatus and displaying a second category of one or more input options in response to said coupling of said second brew basket, said second category of one or more input options being different than said first category.

In addition to one or more of the features described above, or as an alternative, in further embodiments said first brew basket and said second brew basket are interchangeably coupleable to said housing.

In addition to one or more of the features described above, or as an alternative, in further embodiments said first category of one or more input options corresponds to a coffee beverage and said second category of one or more input options corresponds to a tea beverage.

In addition to one or more of the features described above, or as an alternative, in further embodiments said first brew basket defines a first brew chamber having a first configuration and second brew basket defines a second brew chamber having a second configuration, said first configuration being different than said second configuration.

In addition to one or more of the features described above, or as an alternative, in further embodiments comprising sensing said brew basket coupled to said housing to identify said first category of one or more input options.

In addition to one or more of the features described above, or as an alternative, in further embodiments said sensing said brew basket includes reading a sensor connected to said brew basket.

In addition to one or more of the features described above, or as an alternative, in further embodiments said sensor is a magnet.

In addition to one or more of the features described above, or as an alternative, in further embodiments said sensor is a radio frequency identification sensor.

In addition to one or more of the features described above, or as an alternative, in further embodiments comprising selecting a brew cycle from said one or more input options.

In addition to one or more of the features described above, or as an alternative, in further embodiments selecting said brew cycle further comprises selecting at least one of a volume of beverage to be prepared and a style of beverage to be prepared, said brew cycle being identified in response to said selecting at least one of said volume of beverage to be prepared and said style of beverage to be prepared.

According to another embodiment, a method of using a beverage brewing apparatus includes selecting a first brew cycle including at least one first infusion cycle associated with preparation of a first beverage, the first beverage being determined in response to a first type of flavorant, a first brewing style, and a first size, performing said at least one first infusion cycle to prepare said first beverage; selecting a second brew cycle including at least one second infusion cycle associated with preparation of a second beverage, the second beverage being determined in response to a second type of flavorant, a second brewing style, and a second size, and performing said at least one second infusion cycle to prepare said second beverage.

In addition to one or more of the features described above, or as an alternative, in further embodiments said first type of flavorant is different than said second type of flavorant.

In addition to one or more of the features described above, or as an alternative, in further embodiments said first type of flavorant is identical to said second type of flavorant.

In addition to one or more of the features described above, or as an alternative, in further embodiments said first brewing style is different than said second brewing style.

In addition to one or more of the features described above, or as an alternative, in further embodiments said first brewing style is identical to said second brewing style.

In addition to one or more of the features described above, or as an alternative, in further embodiments said first size is different than said second size.

In addition to one or more of the features described above, or as an alternative, in further embodiments said first size is identical to said second size.

In addition to one or more of the features described above, or as an alternative, in further embodiments a parameter associated with said at least one infusion cycle of the first brew cycle is different from a parameter associated with said at least one infusion cycle of the second brew cycle.

In addition to one or more of the features described above, or as an alternative, in further embodiments said parameter includes at least one of fluid temperature, volume of fluid, fluid flow rate, and steep duration for each infusion cycle.

In addition to one or more of the features described above, or as an alternative, in further embodiments said at least one first infusion cycle includes a plurality of first infusion cycles and said at least one second infusion cycle includes a plurality of second infusion cycles, wherein one of said plurality of first infusion cycles is identical to one of said plurality of second infusion cycles.

BRIEF DESCRIPTION OF THE FIGURES

The accompanying drawings incorporated in and forming a part of the specification embodies several aspects of the present disclosure and, together with the description, serves to explain the principles of the disclosure. In the drawings:

FIGS. 7A, 7B, and 7C are various perspective views of a second brew basket for use with the beverage brewing apparatus according to an embodiment;

FIGS. 8A and 8B are various view of a shower head of the beverage brewing apparatus according to an embodiment.

Figure 1:
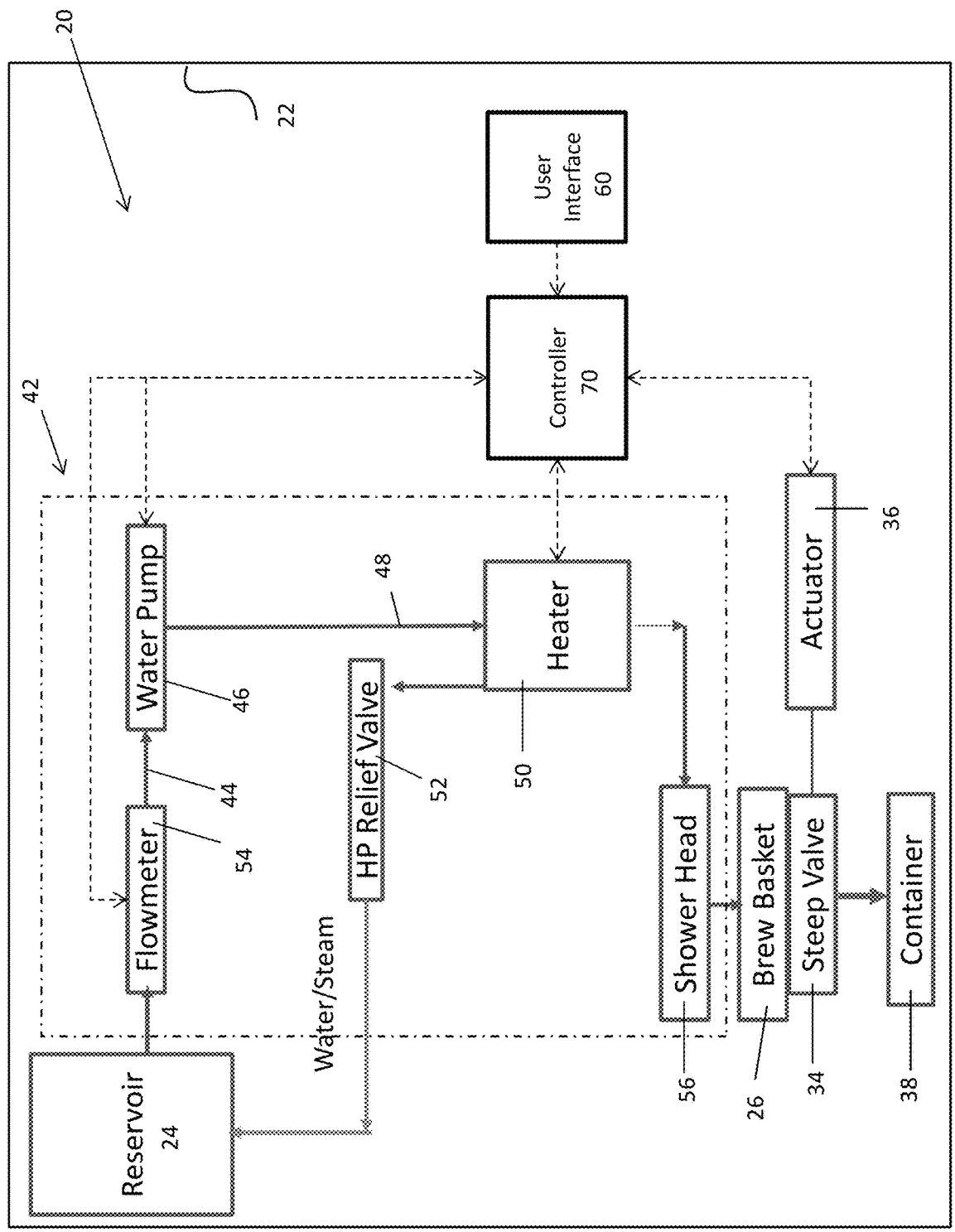
FIG. 1 is a schematic diagram of a beverage brewing apparatus according to an embodiment.

The detailed description explains embodiments of the disclosure, together with advantages and features, by way of example with reference to the drawings.

DETAILED DESCRIPTION

Aspects and embodiments disclosed herein include a system and method for preparing various types of brewed beverages, including both hot and cold brewed beverages. Although the disclosure is described herein with reference to preparing a brewed coffee or tea beverage, preparation of other brewed beverages is within the scope of the disclosure.

As the term is used herein, "coffee" refers to a beverage including solids extracted from coffee beans and dissolved in a fluid.

With reference now to FIGS. 1-4, an example of a system configured to prepare a brewed beverage is shown. In the illustrated, non-limiting embodiment, the beverage brewing system 20 includes a housing 22 and a fluid reservoir 24. The fluid reservoir 24 is configured to store a desired amount of fluid therein for brewing a beverage, such as coffee or tea for example, and in some embodiments may be removably coupled to the remainder of the housing 22 for ease of use. However, embodiments where the system 20 does not include a fluid reservoir 24 are also contemplated herein. In such embodiments, the system 20 may be connected to a fluid source (not shown) and configured to receive a desired amount of fluid therefrom on demand. Although the fluid typically used to prepare a brewed beverage is fluid, it should be understood that as used herein the term "fluid" may include water or any other suitable liquid or fluid.

The system 20 additionally includes a generally hollow brew basket 26 having a brew chamber 28 within which a flavorant F, such as coffee grinds or tea leaves may be housed. In an embodiment, the brew chamber 28 is configured to receive a prepackaged cartridge of flavorant. The term "cartridge" as used herein is intended to encompass any capsule, pod, sachet, wrapper or other container or case containing a material suitable for use with a beverage brewing system 20. Alternatively, or in addition, the brew basket 26 may be compatible for use with a loose flavorant. In one embodiment, the brew chamber 28 is configured to receive a disposable or permanent filter (not shown) such as commonly used in conjunction with a loose flavorant during a beverage brewing process.

The outlet end 30 of the brew basket 26 typically includes an opening 32 through which fluid infused with flavorant F is expelled from the brew chamber 28. In an embodiment, a steeping valve 34 arranged adjacent the outlet end 30 is operable to selectively seal the opening 32 and retain fluid within the brew chamber 28, for example to allow the flavorant F to steep within the fluid. The steeping valve 34 may be operated between an open and closed position by any suitable means, such as an actuator 36 for example.

From the brew basket 26, the brewed beverage is directed into an adjacent container 38 either directly or through one or more conduits or chambers. Examples of containers 38 suitable for use with the beverage brewing system 20, include, but are not limited to, a carafe, a half-carafe, a travel mug, and a cup or mug for example. In an embodiment, illustrated in FIG. 1, the brewed beverage may be configured to drip via gravity from the opening 32 formed in the outlet end 30 of the brew basket 26 into the adjacent container 38.

Figure 2:
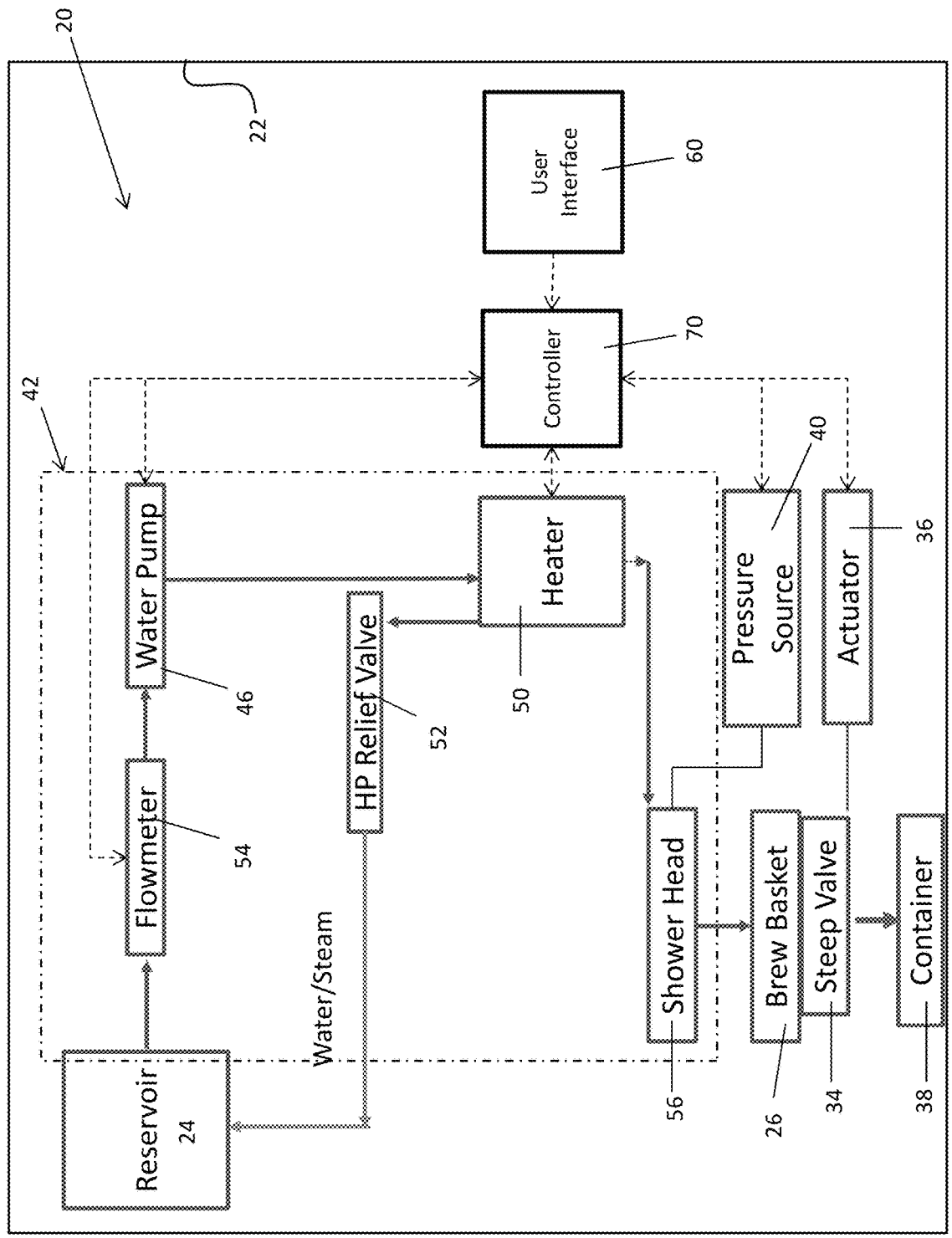
FIG. 2 is a schematic diagram of a beverage brewing apparatus according to another embodiment.
Figure 3:
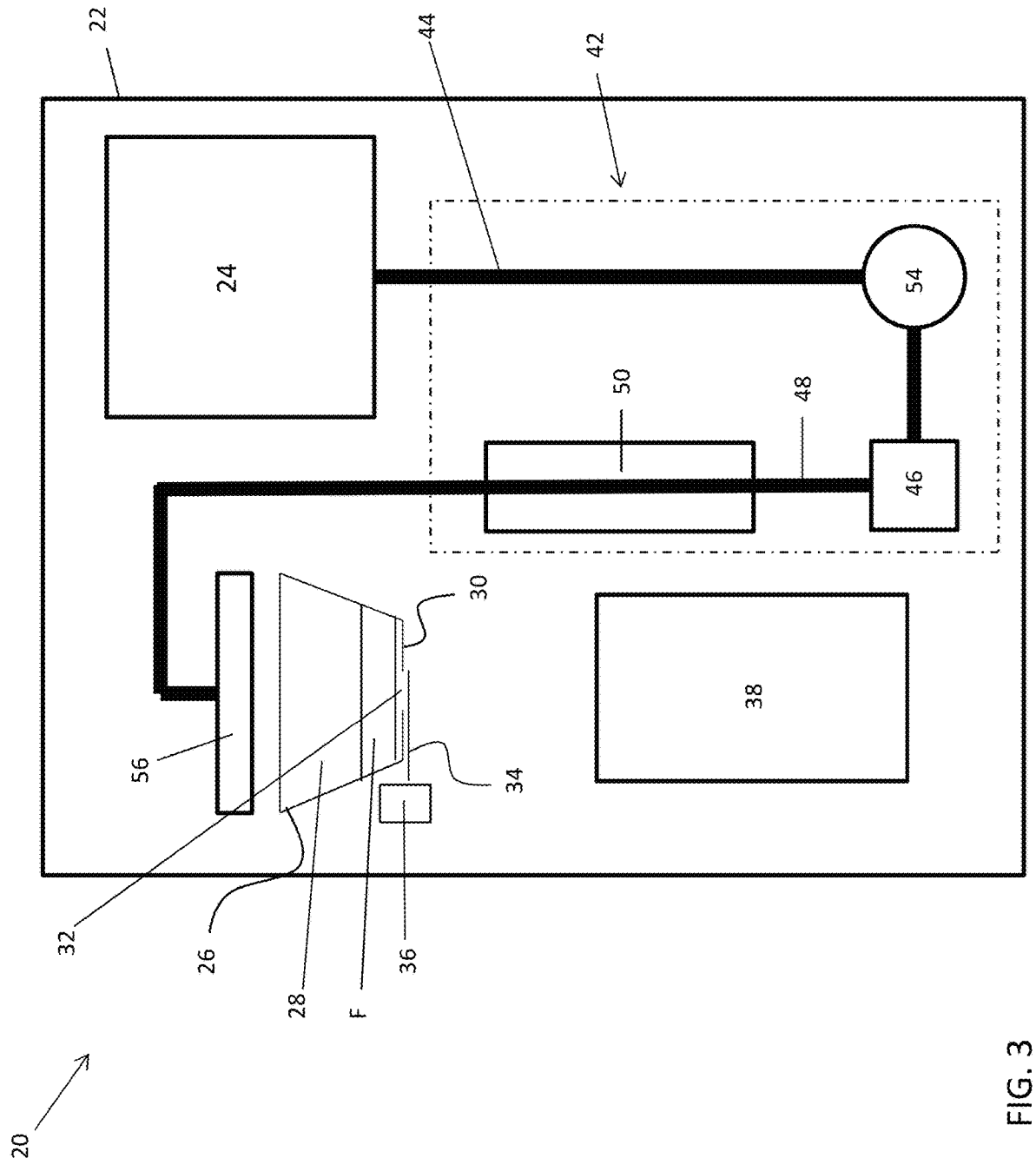
FIG. 3 is a schematic diagram of a beverage brewing apparatus according to an embodiment.
Figure 4:
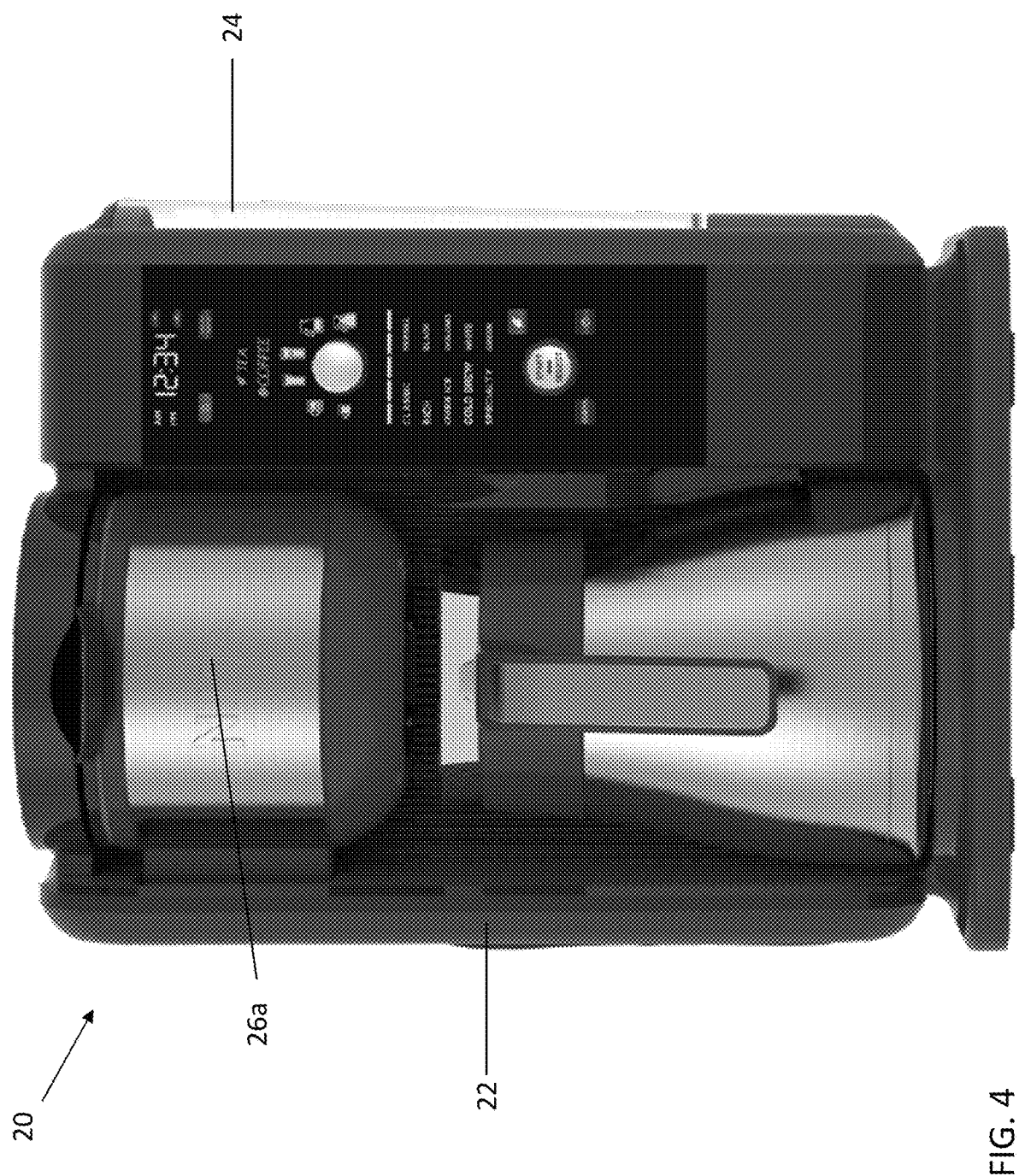
FIG. 4 is a front view of a beverage brewing apparatus according to an embodiment.

In another embodiment, shown in FIG. 2, a pressure source 40 is arranged in fluid communication with the brew chamber 28 and is configured to force the infused fluid from the brew chamber 28 of the brew basket 26. Examples of the pressure source 40 include, but are not limited to a motorized air pump or pressure pump for example, operable to pressurize the interior of the brew basket 26. In such embodiments, the brew basket 26 may be generally sealed against an adjacent component. Further, a valve or other venting mechanism (not shown) associated with the brew chamber 28 of the brew basket 26 may be operated to selectively break the seal between the brew basket 26 and the adjacent component such that pressure is vented or released from the brew chamber 28 to the atmosphere. The valve (not shown) may be operably coupled to the pressure source 40 or to a controller of the beverage brewing system 20, to be described in more detail below.

A fluid delivery system 42 is configured to communicate fluid, for example water, from the fluid reservoir 24 to the brew basket 26. The fluid delivery system 42 includes a first supply line or fluid conduit 44 extending between an outlet end of the fluid reservoir 24 and a pumping mechanism 46. A second supply line 48 connects the downstream end of the pumping mechanism 46 to the brew basket 26. Any suitable type of pumping mechanism 46, including but not limited to a gear pump, peristaltic pump, piston pump, wave pump, and diaphragm pump for example, are within the scope of the disclosure. The pumping mechanism 46 provides a positive pumping action to draw fluid from the fluid reservoir 24 through the first supply line 44 and deliver the fluid to the brew chamber 28 of the brew basket 26 via the second supply line 48.

The fluid delivery system 42 additionally includes a heating mechanism 50 operable to heat the fluid supplied from the fluid reservoir 24 to a desired temperature prior to delivery to the brew basket 26. Accordingly, the heating mechanism 50 is disposed generally between the pumping mechanism 46 and the brew basket 26 relative to the fluid flow path. In an embodiment, the heating mechanism 50 is a flow through heater or boiler configured to heat fluid within the second supply line 48 as it passes through the heating mechanism 50 for example. However, it should be understood that any suitable heating mechanism 50, such as a heating mechanism including a cavity for retaining a quantity of fluid and a heating element (not shown) for heating the fluid retained within the cavity for example, may be included in the fluid delivery system.

In an embodiment, a pressure relief valve 52 is arranged in communication with the heating mechanism 50 and/or the second supply line 48. The pressure relief valve 52 is selectively operable to release the pressure therefrom by venting steam and/or fluid. In the illustrated, non-limiting embodiment, the pressure relief valve 52 is arranged in fluid communication with the fluid reservoir 24 such that vented steam and/or fluid may be recycled within the system 20. In other embodiments, the steam may be vented to the atmosphere adjacent the system 20.

The pumping mechanism 46 may be operable for a predetermined period of time to supply a predetermined amount of fluid to the heating mechanism 50, and therefore the brew chamber 28, based on the size of the beverage being prepared. Alternatively, or in addition, a flow meter 54 may be used to monitor the amount of fluid that passes there through. The flow meter 54 may be located between the fluid reservoir 24 and the pumping mechanism 46, as shown in FIGS. 1 and 2, or at another location within the fluid delivery system 42, such as between the heating mechanism 50 and the brew basket 26. The amount of fluid that passes through the flow meter 54 may represent the amount of fluid provided to the brew chamber 28 of the brew basket 26. Various types of flow meters 54 are within the scope of the disclosure.

After being heated within the heating mechanism 50, the fluid is delivered to the brew chamber 28 of the brew basket 26. In the illustrated, non-limiting embodiment, the fluid delivery system 42 further includes a shower head 56 positioned directly adjacent an end of the brew basket 28. The shower head 56 is configured to receive heated fluid from the second supply line 48 and deliver the heated fluid to the flavorant within the brew chamber 28. The shower head 56 typically includes a plurality of openings (not shown) that distribute fluid over the flavorant F within in the brew chamber 28 in a desired pattern.

The beverage brewing system 20 may include a user interface 60 for receiving one or more inputs from a user. In an embodiment, the user interface 60 may include one or more buttons, knobs, or other control input devices (not shown), such as for selecting one of a plurality of sizes for example. Alternatively or in addition, the user interface 60 may include a touch screen, or may be configured to receive an input via from a smart device, such as a phone or tablet for example, via an "app" or other suitable connection. The selectable brew sizes may include a mug (between about 6 and about 10 ounces), an extra-large mug (between about 8 and about 12 ounces), a travel mug (between about 12 and about 16 ounces), an extra-large travel mug (between about 16 and about 24 ounces), a half-carafe (between approximately 24 and 34 ounces), and a carafe (between about 44 and about 54 ounces). The user interface 60 may additionally include an input device for selecting one of a plurality of types of beverage to be brewed, such as coffee or tea (teas may include black, herbal, oolong, white, green, and delicate), and for selecting a brew style, such as classic, rich, over ice, cold brewed, and specialty. It should be understood that the various inputs described herein are intended as an example only, and that other selectable parameters and options within the disclosed parameters are also within the scope of the disclosure.

Operation of the beverage brewing apparatus 20 is controlled by a controller 70 operably coupled to the pumping mechanism 46, the flow meter 54, the heating mechanism 50, the actuator 36 associated with the steeping valve 34, and in some embodiments the pressure source 40, in response to one or more input signals received from the user interface 60. The controller 70 may include one or more or a microprocessor, microcontroller, application specific integrated circuit (ASIC), or any other form of electronic controller known in the art. In an embodiment, the apparatus 20 includes one or more temperature sensors, such as located adjacent the fluid reservoir 24 and/or at the inlet and/or the outlet of the heating mechanism 50 for example, for measuring the temperature of the fluid within the fluid delivery system 42. The controller 70 is configured to control operation of the fluid delivery system 42 to ensure that the heating mechanism 50, and therefore the fluid provided to the brew chamber 28, has a desired temperature.

Figure 5:
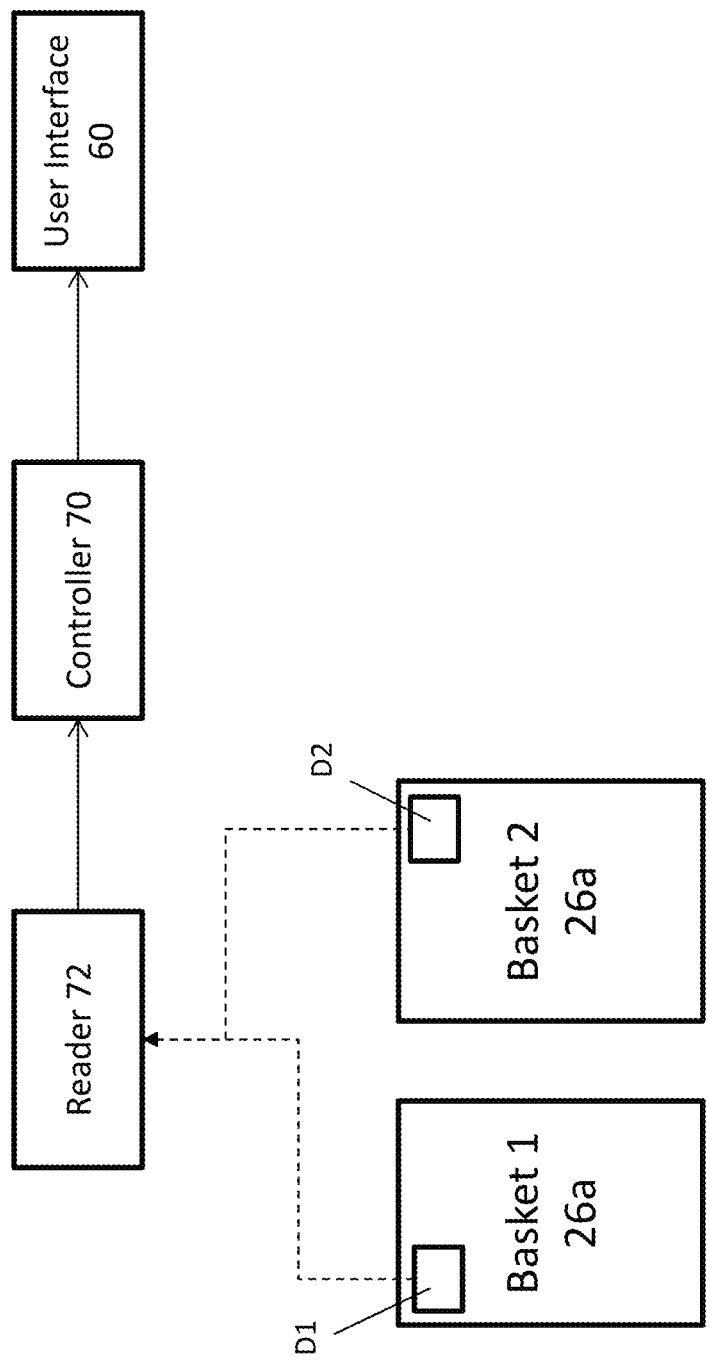
FIG. 5 is a schematic diagram of a system for detecting a brew basket according to an embodiment.

As previously described, the beverage brewing apparatus 20 may be suitable for use with several different types of flavorants, including both coffee and tea for example. With reference now to FIG. 5, in an embodiment, the beverage brewing apparatus 20 includes a first brew basket 26a configured to receive a coffee flavorant and a second brew basket 26b configured to receive a tea or other botanical flavorant. The first and second brew baskets 26a, 26b are interchangeably coupled to the housing 22 of the beverage brewing apparatus 20.

The controller 70 may be configured to determine which brew basket 26 is coupled to the housing 22 and automatically adjust the one or more options selectable via an input of the user interface 60. In an embodiment, the first brew basket 26a includes a first device D1 and the second brew basket 26b includes a second device D2. The devices D1, D2 may be coupled, or alternatively, embedded within the corresponding brew baskets 26a, 26b. A corresponding reader 72 disposed within the housing 22 generally adjacent the brew basket 26, such as near the shower head 56 for example, is configured to sense and identify the first device D1 and the second device D2 to determine which brew basket 26a, 26b is affixed to the housing 22. In an embodiment, the devices D1, D2 are magnetic sensors and the reader 72 is configured to distinguish between the first device D1 and the second device D2 based on the position of each device D1, D2 when the corresponding brew basket 26a, 26b is installed relative to the housing 22. However, it should be understood that any suitable device configured to communicate with the reader 72 to determine the identity of the brew basket 26, such as a mechanical switch or plunger for example, is within the scope of the disclosure. For example, in an embodiment, the devices D1, D2 may be RFID tags, and the reader 72 may be an RFID reader.

Further, as suggested, the controller 70 may be configured to automatically adjust the one or more options selectable via an input of the user interface 60 based on which brew basket 26 is coupled to the housing 22. For example, upon detection of the first brew basket 26a associated with the preparation of a coffee beverage, the user interface 60 may allow a user to select one of a plurality of sizes and one of a plurality of styles for preparing a coffee beverage. Similarly, upon detection of the second brew basket 26b associated with the preparation of a tea beverage, the user interface 60 may allow a user to select not only, one of a plurality of sizes and one of a plurality of styles for preparing a tea beverage, but also one of a plurality of different types of teas.

Figure 6:
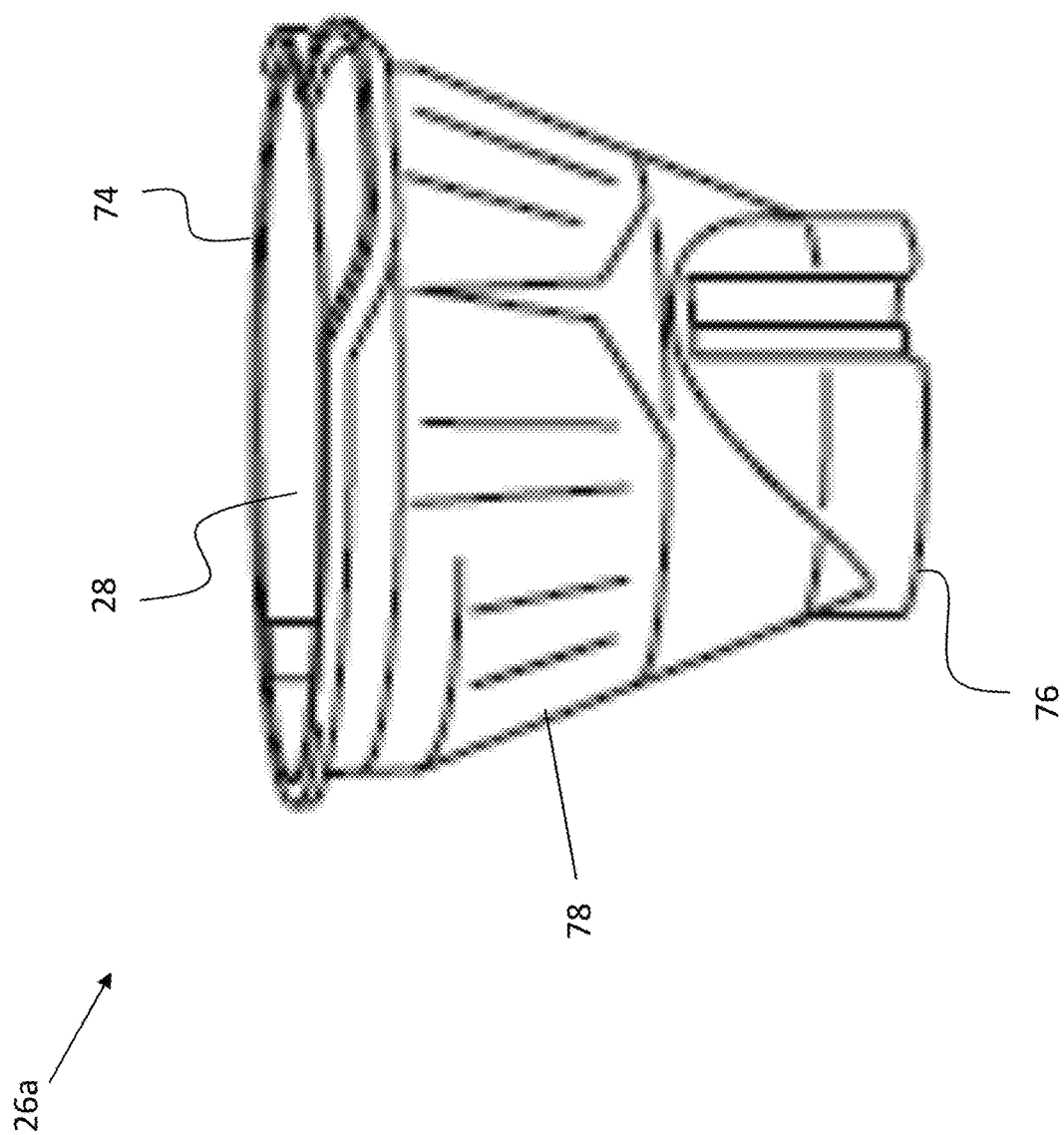
FIG. 6 is a perspective view of a first brew basket for use with the beverage brewing apparatus according to an embodiment.

With reference now to FIGS. 6 and 7, each of the brew baskets 26a, 26b includes a first end 74, a second, opposite end 76, and at least one sidewall 78 extending between the first end 74 and the second end 76 to define an interior brew chamber 28 of the brew basket 26a, 26b. As shown and previously described, the first end 74 of the brew baskets 26a, 26b are generally open, and the second end 76 of the brew baskets 26a, 26b, are generally closed, having only the opening 32 formed therein.

Figure 7A:
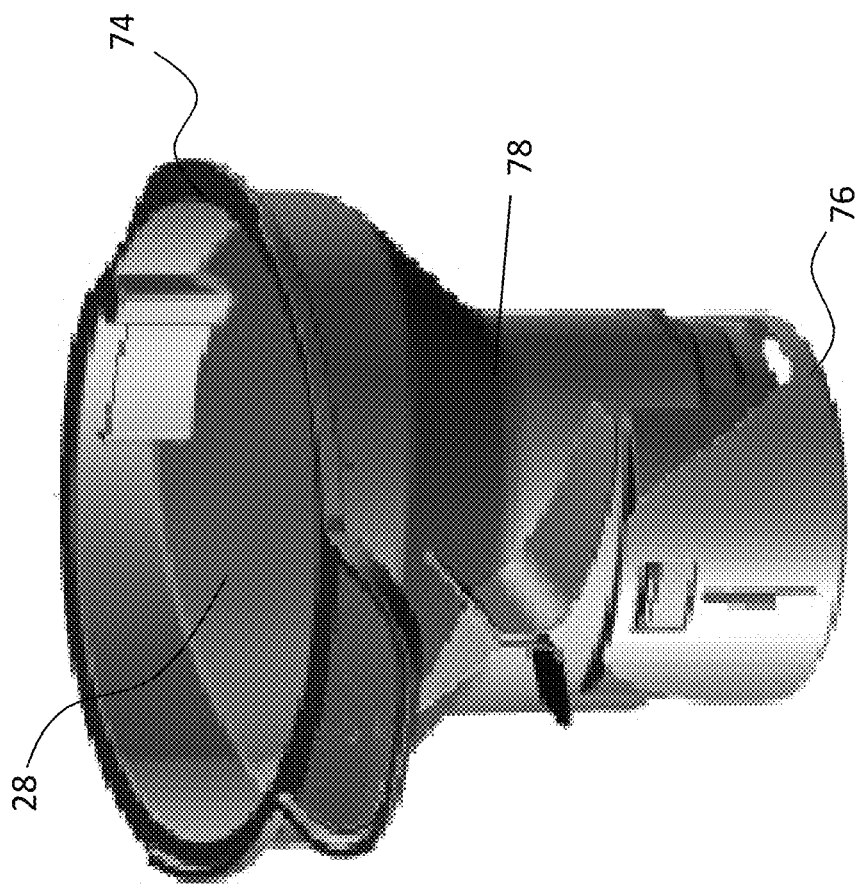

In an embodiment, a configuration of the brew chamber 28 of each of the first and second brew baskets 26a, 26b, is different. For example, a cross-sectional area of the brew chamber 28 of the brew basket 26a associated with the preparation of a coffee beverage may gradually decrease from a first end 74 to a second end 76 of the brew basket 26a. However, the shape of the cross-sectional area of the brew basket 26a may remain generally circular over the height of the brew basket 26a such that the brew chamber 28 is generally frustoconical in shape. In an embodiment, the shape of the cross-sectional area of the brew chamber 28 of the brew basket 26b associated with the preparation of a tea beverage, as shown in FIGS. 7A-7C, varies over the height of the brew basket 26b. For example, the brew chamber 28 may transition from having a generally circular cross-sectional shape arranged near the first end 74 to an oval cross-sectional shape near the second end 76. Toward the second, downstream end 76 of the brew basket 26b, the brew chamber 28 is constricted by forming the sidewall 78 with a desired slope to limit expansion of the tea leaves when wetted, and to drain fluid from the brew chamber 28 at a specific rate.

In an embodiment, the brew basket 26b associated with the preparation of a tea beverage may additionally include one or more retaining elements 80 that extend at least partially across the brew chamber 28. Although a single bar-like retaining element 80 is illustrated in the FIGS., other embodiments including multiple retaining elements 80 having similar or varied configurations are also contemplated herein. Further, the retaining elements 80 need not be formed from a solid material. The retaining elements 80 may be removable, or alternatively, may be permanently affixed to a surface of the brew basket 26b, such as the second end 76 thereof for example. The one or more retaining elements 80 are located at a position within the brew chamber 28, offset from the second end 76, to facilitate submerging the entirety of the tea leaves or other botanical flavorant disposed therein within the fluid provided to the brew chamber 28. The retaining elements 80 may be particularly useful during the preparation of a cold brew or over ice beverage. This is because during preparation of a chilled beverage, the fluid provided to the brew chamber 28 is cooler, making the flavorant more difficult to wet and thus more likely to float to the top of the cool fluid.

With reference no to FIGS. 8A and 8B, an example of the shower head 56 is illustrated in more detail. The shower head 56 is disposed within the housing 22, at a position vertically above the brew basket 26. The shower head 56 is arranged in fluid communication with the brew chamber 28. In an embodiment, the shower head 56 has a plurality of holes 82 formed therein, such as in the bottom 84 of the shower head facing the brew basket 26 for example, and the plurality of holes 82 are arranged in an oval pattern. In an embodiment, the overall dimensions and spacing of the oval pattern of holes 82 is designed to evenly wet a smaller volume of coffee flavorant sitting within a standard paper cone filter. Further, the oval shaped cross-sectional area of the brew chamber 28 near the second end 76 of the brew basket 26b associated with the preparation of a tea beverage may be complementary to the oval pattern of holes 82. In an embodiment, the length of the oval cross-sectional shaped portion of the tea basket 26b is adjusted in height so that the maximum amount of flavorant received therein (i.e. the flavorant required when preparing a full carafe) will nest within the oval vertical walled section underneath the showerhead 56. By forming the portion of the brew basket 28 to be filled with flavorant, i.e. tea leaves in a shape generally complementary to the plurality of holes 82 of the shower head 56, the flavorant arranged within the brew chamber 28 will be substantially evenly wetted and submerged when a fluid is supplied thereto, even in embodiments where a maximum amount of flavorant is arranged within the brew chamber 28.

Various parameters associated with a brew cycle for preparing any selectable combination of size, brew style, and type of flavorant are stored within and/or accessible by the controller 70. In an embodiment, the parameters for performing each brew cycle are associated with a recommended volume of flavorant. The recommended or suggested volume of flavorant is dependent not only on the size of the beverage being prepared, but also on the type of flavorant being used. For example, the suggested amount of flavorant used to prepare a cup of cold brew black tea may be different than the suggested amount of flavorant used to prepare a cup of cold brew green tea. In embodiments where the beverage being prepared is a cold brew coffee, the suggested amount of flavorant i.e. coffee grinds, is scaled roughly linearly based on the size of the beverage being prepared. In an embodiment, the amount of flavorant recommended when preparing a 9.5 ounce coffee is approximately 17 grams and the amount of flavorant recommended when preparing an 18 ounce coffee is approximately 21 grams. However, it should be understood that in some embodiments, the suggested amount of flavorant used to prepare different styles of the same size and type of beverage, i.e. a carafe size of classic coffee and a carafe size of cold brew coffee, may vary.

The stored parameters associated with each brew cycle include a total number of infusion cycles and a fluid temperature, volume of fluid, fluid flow rate, and steep duration for each infusion cycle. Each brew cycle associated with the preparation of one of the plurality of beverages by the brewing apparatus 20 includes one or more infusion cycles. In some embodiments, the total number of infusion cycles within a brew cycle may exceed ten infusion cycles, such as twelve infusion cycles for example. However, it should be understood that a brew cycle having any number of infusion cycles is within the scope of the disclosure. The total number of infusion cycles and/or the parameters associated with each infusion cycle, can be adjusted to achieve a desired flavor profile given the beverage type, brew size, and brew style.

Figure 9:
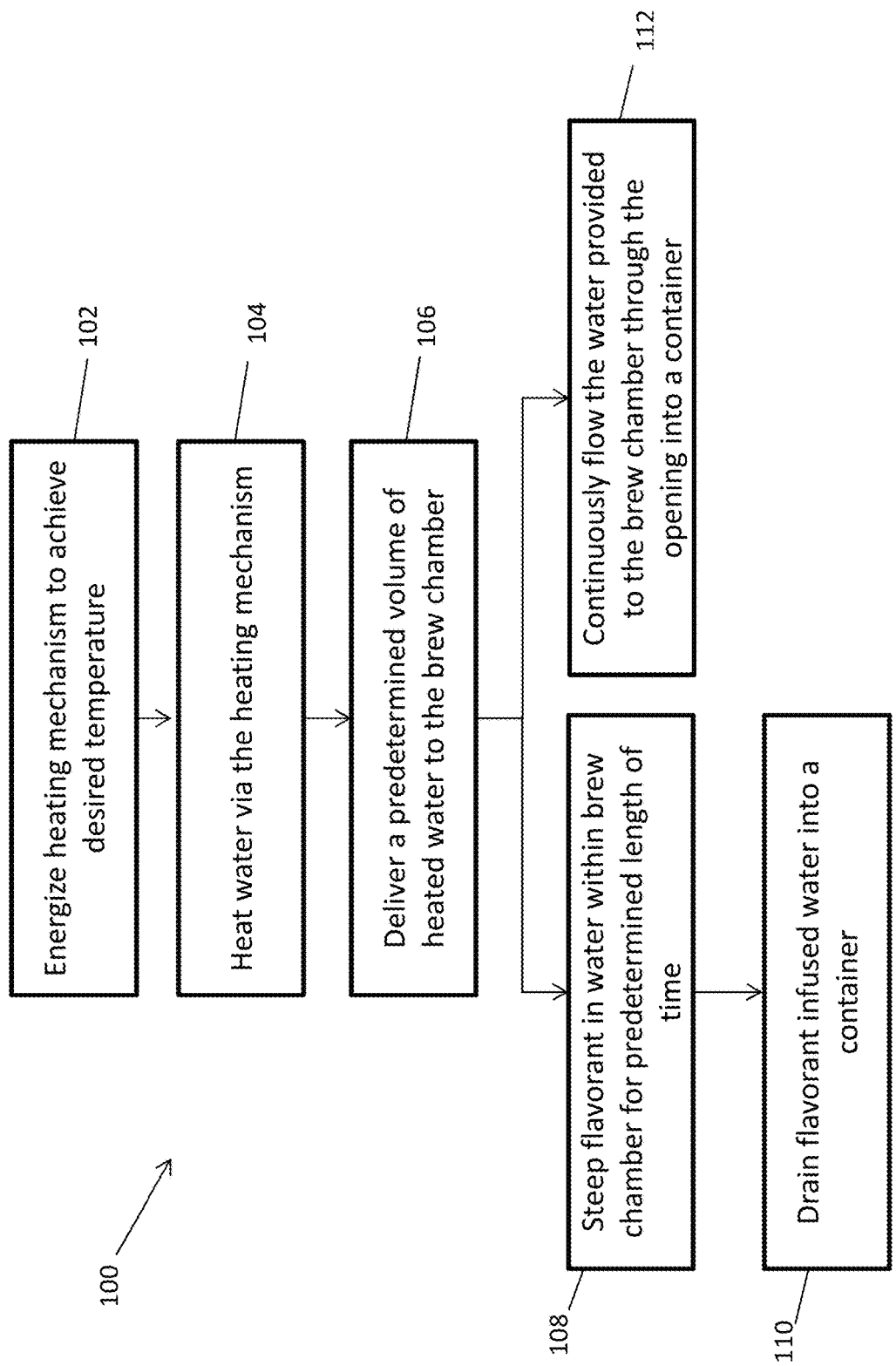
FIG. 9 is a flow diagram of an infusion cycle according to an embodiment.

A flow diagram of an example of an infusion cycle 100 is illustrated in FIG. 9. In an embodiment, the infusion cycle 100 first includes energizing the heating mechanism 50 to a predefined temperature, as shown in block 102. Operation of the fluid delivery system 42 is then initiated, as shown in block 104, to provide fluid to the heating mechanism 50. The pumping mechanism 46 is configured to move the fluid through the heating mechanism 50 with a controlled flow rate intended to maximize the heat transfer to the fluid and thereby minimize the volume of fluid below the predefined temperature. Operation of the pumping mechanism 46 continues until a predetermined volume of heated fluid is delivered to the brew chamber 28 of the brew basket 26, shown in block 106. After the predetermined volume of fluid heated to a desired temperature is delivered to the brew chamber 28, the pumping mechanism 46 and the heating mechanism 50 are de-energized.

In an embodiment, as the fluid is supplied into the brew chamber 28, the steeping valve 34 may be in a closed position, causing the fluid to accumulate within the brew chamber 28, thereby allowing the flavorant to "steep" within the fluid. Accordingly, infusion cycles where the steeping valve 34 is closed as the fluid is supplied to the brew chamber 28 may also be referred to herein as a "steep" cycle. After delivery of the fluid to the brew chamber 28, the steeping valve 34 remains closed for a predetermined length of time, shown in block 108. After this steeping time has elapsed, the steeping valve 34 is opened for a specific amount of time and the flavorant infused fluid is allowed to drain through the opening 32 formed in the outlet end 30 of the brew basket 26 into an adjacent container 38, as shown in block 110. As previously described, the infused fluid may drain via gravity, or in response to an air purge generated by operation of the pressure source 40.

Alternatively, in some embodiments, the steeping valve 34 may be arranged in an open configuration as the fluid is supplied to the brew chamber 28. As a result, a portion of the fluid provided to the brew chamber 28 will continuously drain through the opening 32 into an adjacent container 38 until the entirety of the fluid that has not been absorbed by the flavorant is expelled from the chamber 28, as shown in block 112. Accordingly, infusion cycles where the steeping valve 34 is at least partially open as the fluid is supplied to the brew chamber 28 may also be referred to herein as a "flow through" cycle. In instances where the flow rate of the fluid provided to the brew chamber 28 is greater than the flow rate of the fluid at the opening 32, the fluid may accumulate at least partially within the brew chamber 28.

In an embodiment, subsequent infusion cycles within a brew cycle may overlap one another to "blend" the flavorant infused fluid of each infusion cycle. In such embodiments, a volume of fluid associated with an infusion cycle is provided the brew chamber 28 while the brew chamber 28 is still at least partially filled with fluid from the previous infusion cycle. As a result, the fluid from the first and second sequential infusion cycles mixes within the brew chamber 28, thereby enhancing the consistency between flavorant infused fluid generated during sequential infusions. This blending of infusions may be particularly useful in the brew cycles associated with the preparation of a large tea beverage, such as either the half-carafe, or carafe size. However, it should be understood that such blending of infusion cycles may be used during the preparation of any beverage by the beverage brewing apparatus 20.

The total number of infusion cycles performed by the system 20 within an individual brew cycle will vary based on several factors including the arrangement of the flavorant, and more specifically whether the flavorant is loose or arranged within a cartridge. For example, a brew cycle for preparing a cold brew coffee using loose grounds in an open brew basket 26 typically requires fewer infusion cycles than a brew cycle for preparing a cold brew coffee using a cartridge to achieve proper extraction. Similarly, preparation of a cold brew tea using whole leaf tea may require more infusion cycles, or alternatively, a different number of infusion cycles than if the flavorant were arranged within a tea bag for example. In addition, total number of infusion cycles may also vary based on the complexity and/or grind size of the flavorant, which can affect the extraction thereof. In embodiments where the flavorant has a fine grind size, flavor will extract more quickly than from a flavorant having a larger or coarser grind size. Accordingly, the brew cycle can be adapted to compensate for the configuration (loose or in a cartridge), complexity, and size of the flavorant being used to achieve a desired flavor profile.

In embodiments where a brew cycle includes a plurality of infusion cycles, each of the plurality of infusion cycles may be the same, or alternatively, may be different. In an embodiment, during preparation of a beverage having multiple infusion cycles, the temperature of the fluid provided for each sequential infusion cycle may vary. Because different components or solubles, and therefore flavors, extract from a flavorant at different fluid temperatures, particularly during the preparation of a tea beverage, the temperature of the fluid provided to the flavorant may be controlled to enhance the flavor profile of the resulting beverage. The fluid temperature may therefore be actively adjusted during an infusion cycle to achieve a desired balance between the extracted flavors of the brewed beverage. Accordingly, fluid having a first temperature may be used to extract a first flavor during a first infusion cycle and fluid having a second temperature may be used to extract a second flavor, different from the first flavor, during a second infusion cycle. The difference between the first temperature and the second temperature may be achieve by controlling operation of the heating mechanism 46 and/or by controlling the rate of delivery of the fluid to the shower head 56 and brew chamber 28. In an embodiment, the temperature of the fluid provided for sequential infusion cycles may gradually decrease in temperature. Alternatively, the temperature of the fluid provided for sequential infusion cycles may gradually increase in temperature. In other embodiments, the temperature may be configured to increase between sequential infusion cycles and also decrease between sequential infusion cycles.

In yet another embodiment, the temperature of the fluid provided to the brew chamber 28 within a single infusion cycle may vary. For example, the initial fluid provided to the brew chamber 28 may have a first temperature. After a first volume of fluid at the first temperature has been provided to the brew chamber 28, the temperature of the fluid may be adjusted such that a second volume of fluid r having a second temperature, different from the first temperature, is provided to the brew chamber 28. In such embodiments, the first and second volumes of fluid are provided to the brew chamber 28 substantially continuously. This temperature variation is distinguishable from existing beverage brewing systems that automatically prepare a brewed beverage because those machines are typically designed to maintain the fluid provided to a flavorant at a constant temperature over the entire length of the beverage preparation process.

Further, in an embodiment, during preparation of a beverage having multiple infusion cycles, where the flavorant is steeped within the fluid provided to the brew chamber 28, the length of the steeps of each steep cycle may vary. In an embodiment, the length of the steeps decreases sequentially. Using longer steeps followed by progressively shorter steeps can enhance the flavor profile of the resulting beverage. In an embodiment, the volume of fluid provided to the brew chamber 28 is dependent on the length of the steep. As a result, the volume of fluid may also progressively decrease with each steep cycle. However, embodiments where the steeps are equal lengths and the volumes of fluid are equal, increase sequentially, or vary randomly are also contemplated herein.

During preparation of a cold brewed beverage, the temperature of the fluid delivered to the brew chamber 28 may affect the overall taste of the beverage produced by the system 20. If the fluid is too cold, extraction from the flavorant may be low, and alternatively, if the fluid is too hot, too much acidity may be released from the coffee grinds, and too much astringency may be released from the tea leaves. During preparation of a cold brew beverage, the fluid temperature associated with each steep cycle is between about 30° C. and about 50° C. In an embodiment, the fluid temperature associated with preparation of a tea beverage is generally warmer, for example between 48° C. and 52° C., such as 50° C., than the fluid temperature associated with preparation of a coffee beverage, generally between 38° C. and 42° C., for example 40° C.

Further, each of the cold brew and over-ice beverages prepared by the beverage brewing apparatus is intended to be received within a container 38 filled at least partially with ice. For example, at least half the volume of the container may be filled with ice cubes for example. When a hot or warm beverage, such as a tea for example, contacts ice, the beverage becomes cloudy, which is generally less appealing to a consumer. In an embodiment, to prevent or reduce this clouding, the flavorant infused fluid output from the brew basket 26 is cooled prior to being dispensed over the ice in the adjacent container. This cooling may occur by allowing the flavorant to steep within the fluid and/or by controlling the flow rate at which the fluid is provided to the container 38.

A beverage brewing apparatus as illustrated and described herein is better able to achieve an ideal flavor for each combination of type, style, and size of beverage prepared.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of preparing a brewed beverage using a beverage brewing apparatus comprising:
   providing a flavorant;
   identifying a process cycle including a plurality of sequential infusion cycles for preparing the brewed beverage;
   performing said plurality of sequential infusion cycles, wherein said performing said plurality of sequential infusion cycles includes providing a fluid to said flavorant within a brew chamber; and
   varying a temperature of said fluid provided to said flavorant during a first infusion cycle of said plurality of infusion cycles,
   wherein each respective infusion cycle defines a respective steep during which the flavorant is steeped within the fluid provided to the brew chamber,
   wherein during each infusion cycle, a steeping valve remains closed during a steeping time to cause the fluid to accumulate within the brew chamber, and is then opened to allow the fluid to drain from the brew chamber, and
   wherein the steeps decrease progressively in length with each infusion cycle.

2. The method of claim 1, wherein said temperature is varied from a first temperature to a second temperature, and said first temperature is greater than said second temperature.

3. The method of claim 1, wherein said temperature of said volume of fluid is dependent on said flavorant.

4. The method of claim 1, further comprising selecting at least one of a volume of beverage to be prepared and a style of beverage to be prepared, said one or more infusion cycles being identified in response to selecting at least one of said volume of beverage to be prepared and said style of beverage to be prepared.

5. The method of claim 1, wherein said one or more infusion cycles further comprises heating said fluid within a heating mechanism prior to providing said fluid to said flavorant.

6. A method of preparing a brewed beverage using a beverage brewing apparatus comprising:
providing a flavorant within a brew basket;
selecting a brew process including a plurality of sequential infusion cycles, said plurality of sequential infusion cycles including a first infusion cycle and a second infusion cycle, wherein each respective infusion cycle defines a respective steep during which said flavorant is steeped within a fluid provided to said brew basket and wherein said respective steeps progressively decrease in length with each infusion cycle;
performing said first infusion cycle to extract a first flavor from said flavorant, said first infusion cycle including providing a first volume of said fluid to said flavorant; and
performing said second infusion cycle to extract a second flavor from said flavorant, said second infusion cycle including providing a second volume of said fluid to said flavorant such that at least a portion of said first volume of fluid and at least a portion of said second volume of fluid mix within said brew basket.

7. The method of claim 6, wherein performing said second infusion cycle further comprises draining said first volume of said fluid from said flavorant.

8. The method of claim 6, wherein performing said second infusion cycle further comprises providing said second volume of said fluid to said flavorant as said first volume of fluid drains from said flavorant.

9. The method of claim 6, wherein said first infusion cycle further comprises steeping said flavorant within said first volume of said fluid for a predefined length of time.

10. The method of claim 6, wherein said first volume of said fluid has a first temperature configured to extract said first flavor from said flavorant and said second volume of said fluid has a second temperature configured to extract said second flavor from said flavorant, said second temperature being different from said first temperature.

11. The method of claim 6, further comprising selecting at least one of a volume of beverage to be prepared and a style of beverage to be prepared.

12. The method of claim 6, further comprising selecting a category of flavorant.

13. A method of preparing a brewed beverage comprising:
selecting a brew cycle including a plurality of sequential infusion cycles, wherein each respective infusion cycle defines a respective steep during which a flavorant is steeped within a fluid provided to a brew basket and wherein said respective steeps progressively decrease in length with each infusion cycle; and
performing each infusion cycle of said plurality of sequential infusion cycles, wherein a temperature of said fluid provided to said flavorant during at least one infusion cycle of the plurality of sequential infusion cycles is varied, each infusion cycle including:
providing a volume of said fluid to said flavorant;
maintaining a steeping valve in a closed position during a steeping time to cause said fluid to accumulate within said brew basket;
cooling said volume of fluid;
purging said cooled volume of fluid from said flavorant by opening said steeping valve, and
providing said cooled volume of fluid to a container at a flow rate,
wherein cooling said volume of fluid is performed by allowing said flavorant to steep within said fluid.

14. The method of claim 13, wherein said container is at least partially filled with ice.

15. The method of claim 13, wherein performing said brew cycle includes steeping said flavorant within said volume of fluid, said volume of fluid having a temperature between about 30° C. and about 50° C.

16. The method of claim 13, wherein purging said cooled volume of fluid from said flavorant includes draining said volume of fluid via gravity.

17. The method of claim 13, wherein purging said cooled volume of fluid further comprises operating a pressure source to increase a pressure within said brew basket.

18. The method of claim 13, wherein opening the steeping valve exposes an opening in said brew basket.

* * * * *